United States Patent

Purdy

[11] Patent Number: 5,567,142
[45] Date of Patent: Oct. 22, 1996

[54] BURNER SYSTEM FOR A RADIO-CONTROLLED HOT AIR BALLOON

[76] Inventor: Bruce Purdy, 2840 El Cerquito NW., Albuquerque, N.M. 87120

[21] Appl. No.: 297,309

[22] Filed: Aug. 26, 1994

[51] Int. Cl.⁶ ........................................ F23N 1/00
[52] U.S. Cl. ...................... 431/18; 431/231; 431/236; 244/31; 244/96
[58] Field of Search ................ 431/18, 232, 236, 431/237, 233, 247, 231; 244/31, 96, 190

[56] References Cited

U.S. PATENT DOCUMENTS

| | | | |
|---|---|---|---|
| 1,947,194 | 2/1934 | Engh | 431/231 |
| 2,067,412 | 1/1937 | Pickup | 431/231 |
| 2,295,501 | 9/1942 | Jones | 431/236 |
| 3,096,048 | 7/1963 | Yost | 244/31 |
| 5,149,015 | 9/1992 | Davis | 244/31 |

FOREIGN PATENT DOCUMENTS 2507147  12/1982  France ........................... 244/96

*Primary Examiner*—James C. Yeung
*Attorney, Agent, or Firm*—Robert W. Becker & Associates

[57] ABSTRACT

A burner system for a radio-controlled hot air balloon. The frame that is connected to an envelope contains two fuel tanks. One fuel tank is disposed right side up and delivers fuel in vapor form to a pilot burner mechanism. The other fuel tank is inverted and delivers in liquid form to a burner coil means. The flame of the pilot burner mechanism partially heats the liquid fuel in the burner coil means so that when a valve member is opened, fuel in a vaporous mist form is discharged from an outlet orifice of the burner coil means for ignition by the flame of the pilot burner mechanism. A radio-controlled servo is connected to the valve member and operates the same.

14 Claims, 4 Drawing Sheets

FIG—1

BURNER SYSTEM FOR A RADIO-CONTROLLED HOT AIR BALLOON

BACKGROUND OF THE INVENTION

The present invention relates to a burner system for a radio-controlled hot air balloon.

U.S. Pat. No. 5,149,015, Davis, discloses a radio controlled hot air balloon. The problem with this known radio controlled hot air balloon is that it not only has a very complicated burner system, but it is also very unreliable, with it being extremely difficult to maintain a controlled burn with this known system.

It is therefore an object of the present invention to provide a reliable yet straight-forward burner system for a radio controlled hot air balloon whereby a flame for heating the air in the balloon envelope can be provided whenever needed by ignition of a vaporous fuel mist from a constant pilot flame.

BRIEF DESCRIPTION OF THE DRAWINGS

This object, and other objects and advantages of the present invention, will appear more clearly from the following specification in conjunction with the accompanying schematic drawings, in which.

SUMMARY OF THE INVENTION

The burner system for a radio-controlled hot air balloon of the present invention is characterized primarily by the following features: a frame; a first fuel tank held by the frame; a second fuel tank held by the frame; a pilot burner mechanism mounted to the frame and connected by a first fuel line to the first fuel tank for receiving fuel in vapor form therefrom; a burner coil means mounted to the frame and connected by a second fuel line to the second fuel tank for receiving fuel in liquid form therefrom, the burner coil means being adapted to be partially heated by a flame from the pilot burner mechanism and having an outlet orifice for the discharge of fuel in a vaporous mist form for ignition by the flame of the pilot burner mechanism; a valve member provided in the burner coil means for controlling flow of fuel therethrough; and a radio-controlled servo mounted on the frame and connected to the valve member for operating the same.

With the burner system of the present invention, a flame from the pilot burner mechanism will partially heat liquid fuel in the burner coil means, which comprises at least three and a half turns, so that when the valve member is opened, fuel in a vaporous mist form will be released at the outlet orifice. When this vaporous mist is ignited by the flame of the pilot burner mechanism, a steady flame results that is reliably maintained until the valve member is again closed. Maintaining a constant flame of the vaporous mist that is discharged from the outlet orifice of the burner coil means is ensured because the flame thereof is directed at the turns of the burner coil means to further heat liquid fuel that is supplied to the turns.

DESCRIPTION OF PREFERRED EMBODIMENTS

Figure 1:
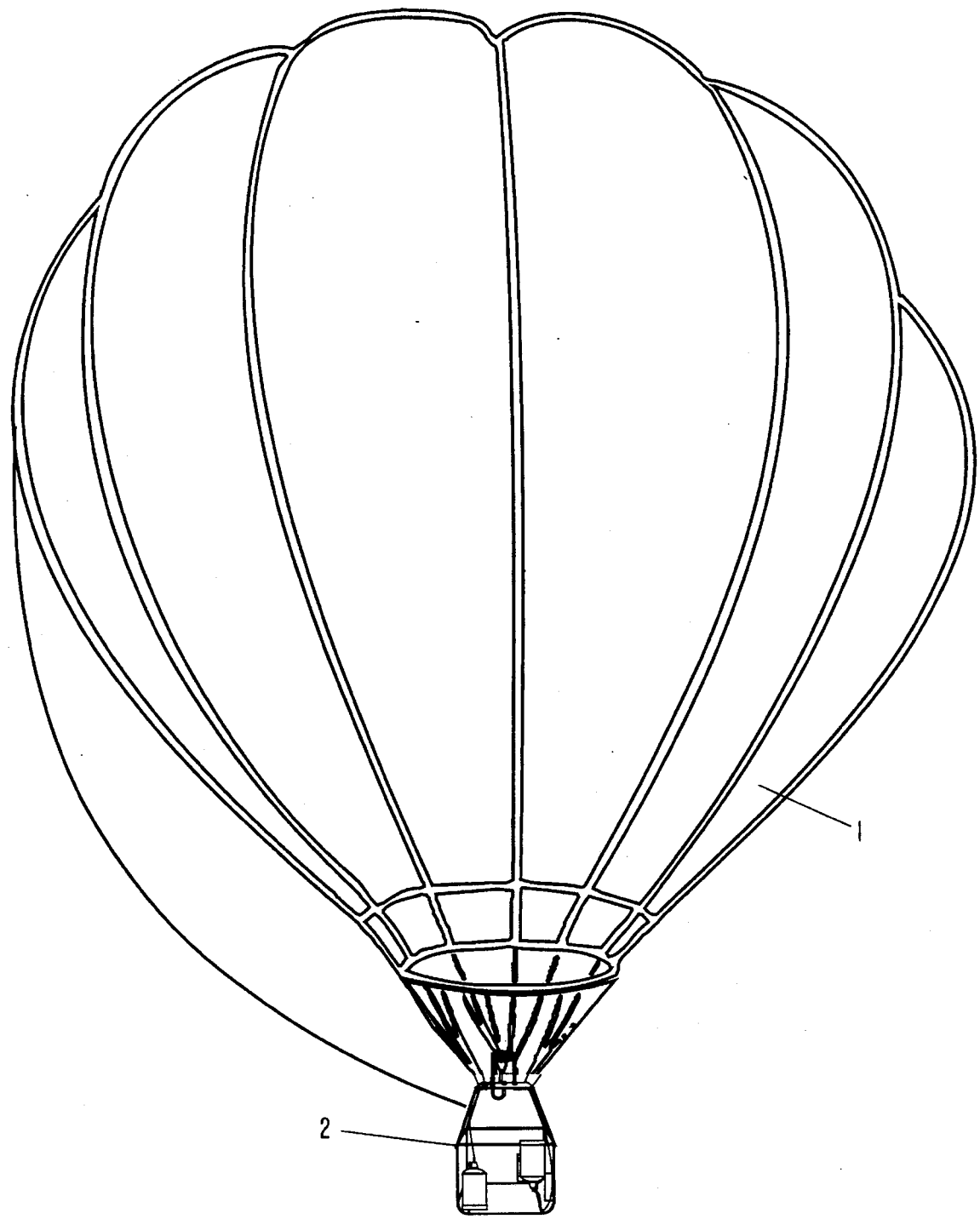
FIG. 1 shows a balloon envelope connected to a basket or frame that contains one exemplary embodiment of the inventive burner system.

Referring now to the drawings in detail, the radio-controlled hot air balloon illustrated in FIG. 1 comprises an envelope 1 to which a basket 2, in the form of a frame, is connected by cables, for example twelve steel cables.

Figure 2:
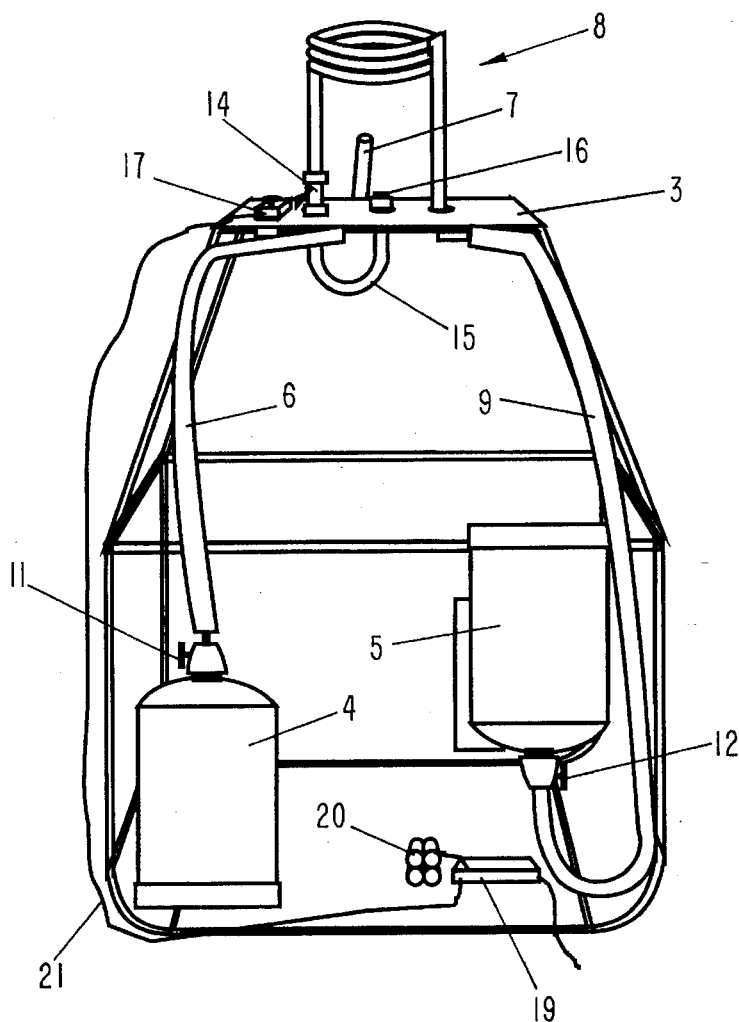
FIG. 2 shows the burner system mounted in the frame.
Figure 3:
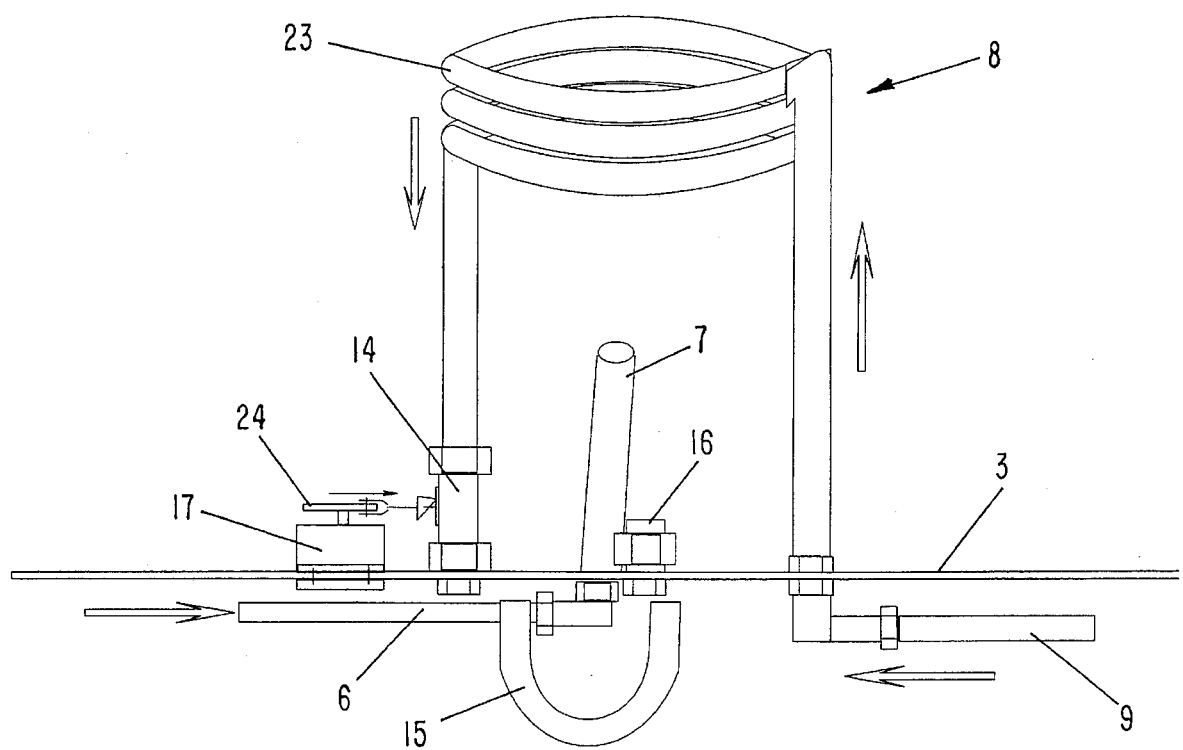
FIG. 3 is a detailed view showing the pilot burner mechanism and the burner coil means of the present invention.
Figure 4:
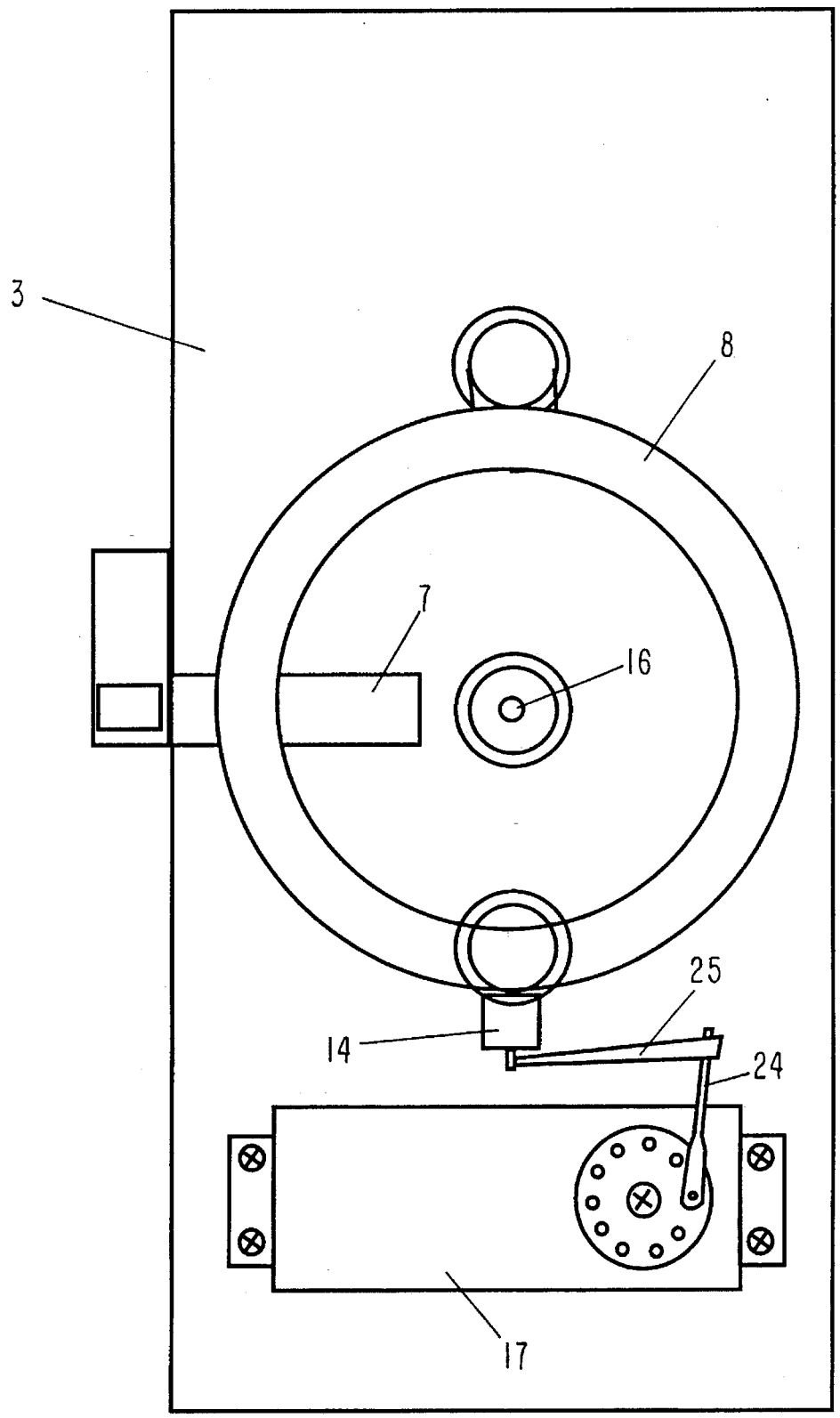
FIG. 4 is a view of the arrangement of FIG. 3 as seen from above.

The burner system of the present invention is supported on the basket or frame 2, and is shown in detail in FIGS. 2–4. For purposes of weight reduction, as well as for adequate strength, the basket 2 is constructed of aluminum. A burner plate 3, preferably also made of aluminum, is secured to the top of the basket or frame structure, for example by being screwed or bolted thereto. Two fuel tanks 4 and 5, for example two sixteen ounce propane tanks, are securely held in the basket, for example at opposite corners thereof, with elastic straps or in any other convenient manner. The first fuel tank 4 is disposed right side up so as to provide fuel in vapor form through a first fuel line 6 to a pilot burner mechanism 7. The pilot burner mechanism 7 is intended to operate with a constant flame, and is directed at a burner coil means 8. In particular, the tip of the flame is intended to be essentially centered relative to the burner coil means 8. The inlet side of the burner coil means 8 is connected via a second fuel line 9 to the second fuel tank 5, which is disposed in the basket 2 in an inverted state so as to be able to supply liquid fuel to the burner coil means 8.

Figure 2A:
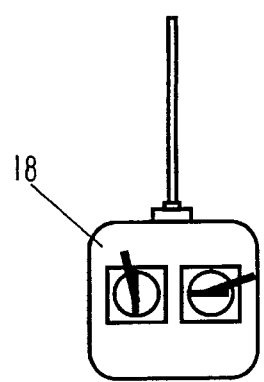
FIG. 2a shows a two channel radio transmitter.

The burner system of the present invention operates as follows. When the shut-off valve 11 on the fuel tank 4 is opened, fuel in vapor form from this upright fuel tank passes through the fuel line 6 to the pilot burner mechanism 7, which is, for example, a torch tip such as is used in propane brazing kits. The issuing fuel vapor is ignited to produce a constant flame that is preferably just long enough to touch the burner coil means 8 for a purpose that will be described subsequently. When it is desired to heat the air in the envelope 1, for example for ascension purposes, pressurized liquid fuel from the inverted fuel tank 5, which fuel due to previous opening of the shut-off valve 12 has been supplied via the fuel line 9 to the burner coil means 8, can now be released via the valve member or blast valve 14 so as to pass through the U-shaped portion 15 of the burner coil means 8 and exit as a pressurized vaporous mist at the outlet orifice 16 of the burner coil means 8, whereupon the fuel mist is ignited by the flame of the pilot burner mechanism 7. Actuation of the valve member 14 is effected by a radio-controlled servo 17 that is mounted on the burner plate 3 of the basket 2. A signal is transmitted from a transmitter 18, such as the two channel transmitter illustrated in FIG. 2a, with this signal being received by a receiver 19 that is provided in the basket 2. This receiver 19, which is powered, for example, by a battery pack 20, transmits a further signal via the lead 21 to the servo 17.

The fuel that is present in the turns 23 of the burner coil means 8 is preheated by the flame of the pilot burner mechanism 7 while awaiting release through the valve member 14. When the servo 17 is activated and the valve member 14 is opened, preheated fuel passes downwardly from the turns 23 of the burner coil means 8 into the U-shaped portion 15 and then exits upwardly as vaporous fuel mist from the outlet orifice 16. This orifice is centered below the turns 23 of the burner coil means 8. The fuel mist is directed straight up through the tip of the flame of the pilot burner mechanism 7 and is ignited just below the turns 23 of the coil means. The burning vaporous fuel mist will now not only heat up the air in the balloon envelope 1, but also very importantly will further preheat the fuel that is flowing through the turns 23 of the burner coil means 8. This is extremely important so as to ensure that vaporous mist is discharged from the outlet orifice 16 rather than having liquid fuel be released, which not only results in poor fuel consumption but also does not allow for controlled heating of the air in the envelope 1. In addition, it is not possible to maintain a constant flame if only liquid fuel is being discharged from the orifice 16. Activation and deactivation of the valve member 14 is effected as required.

Not only are the locations of the pilot burner mechanism 7 and of the outlet orifice 16 of the burner coil means 8 relative to the turns 23 thereof of great significance, the number of turns 23 is also very important. In particular, the burner coil means 8 must have a minimum of 3 and ½ turns 23 in order to ensure that the fuel stays in the coil means 8 long enough to be preheated. If too few turns are provided, fuel that is only in liquid form will pass through the burner coil means 8 and the necessary vaporous mist form of the fuel required for proper operation will not be produced. Pursuant to one preferred specific embodiment of the present invention, 4 and ½ turns 23 are provided for the burner coil means 8.

Pursuant to one preferred embodiment of the present invention, the servo 17 includes a lever mechanism 29 that is connected to the valve member 14 to open and close the same in response to a signal from the receiver 19. If the valve member 14 is a gate or toggle valve, such as produced by the Whitey Co. of Highland Heights, Ohio, the lever mechanism 24 of the servo 17 is connected to the handle 25 of the valve member 14, with this handle 25 acting on a spring tensioned stem for opening and closing the valve.

In order to provide for longer flight times for the balloon, a further fuel tank can be provided in addition to the fuel tank 5. This additional fuel tank will also be inverted and can be connected to the fuel line 9 and/or to the inlet side of the burner coil means 8 in any convenient manner.

In order for an operator or pilot of the balloon to have complete control over lateral movement, a tether line would be connected to the basket 2. In a typical embodiment of the present invention, the envelope 1 would be 16 to 18 feet in length, and would be inflated with air in the same manner as this is accomplished with full size hot air balloons, namely via the use of an electric fan or a gas-powered blower.

To finish the look of the basket 2, the sides thereof can be covered, for example, with plastic panels that are secured to the aluminum structure by snaps or by Velcro. Such panels can be easily removed to allow video or 35 mm camera equipment to be placed in the basket and to operate without obstruction.

The present invention is, of course, in no way restricted to the specific disclosure of the specification and drawings, but also encompasses any modifications within the scope of the appended claims.

What I claim is:

1. A burner system for a radio-controlled hot air balloon, comprising:

a frame;

a first fuel tank held by said frame in a right side up state;

a second fuel tank held by said frame in an inverted or upside down manner;

a pilot burner mechanism mounted to said frame and connected by a first fuel line to said first fuel tank for receiving fuel in vapor form therefrom;

a burner coil means mounted to said frame and connected by a second fuel line to said second fuel tank for receiving fuel in liquid form therefrom, said burner coil means being adapted to be partially heated by a flame from said pilot burner mechanism and having an outlet orifice for the discharge of fuel in a vaporous mist form for ignition by said flame of said pilot burner mechanism;

a valve member provided in said burner coil means for controlling flow of fuel therethrough; and a radio-controlled servo mounted on said frame and connected to said valve member for operating same.

2. A burner system according to claim 1, wherein said first and second fuel tanks are propane tanks.

3. A burner system according to claim 2, wherein a burner plate is mounted to a top portion of said frame, said pilot burner mechanism, said burner coil means, and said radio-controlled servo being mounted on said burner plate.

4. A burner system according to claim 3, wherein said burner coil means comprises, in sequence, a vertically extending inlet portion extending from and perpendicular to said burner plate, coil turns disposed essentially parallel to said burner plate, a vertically extending outlet portion returning to said burner plate and extending perpendicular thereto, and a U-shaped portion that leads to said orifice and is disposed substantially on a side of said burner plate remote from said coil turns of said burner coil means.

5. A burner system according to claim 4, wherein said coil turns of said burner coil means comprises at least 3½ turns.

6. A burner system according to claim 5, wherein said coil turns comprises 4½ turns.

7. A burner system according to claim 5, wherein said valve member is disposed in said outlet portion of said burner coil means between said coil turns and said U-shaped portion.

8. A burner system according to claim 4, which includes a receiver held by said frame for receiving signals from a transmitter, wherein a lead connects said receiver to said servo for transmitting said signals thereto to activate said servo for operating said valve member.

9. A burner system according to claim 8, which includes battery means for powering said receiver.

10. A burner system according to claim 8, wherein said servo includes a lever mechanism connected to said valve member to operate same by opening and closing said valve member in response to signals transmitted to said servo from said receiver.

11. A burner system according to claim 10, wherein said valve member is a toggle valve having a handle to which said lever mechanism of said servo is connected.

12. A burner system according to claim 4, wherein said pilot burner mechanism is disposed such that the tip of a flame therefrom would be located centrally below said coil turns of said burner coil means.

13. A burner system according to claim 12, wherein said outlet orifice of said burner coil means is disposed on a side of said burner plate facing said coil turns and is positioned centrally below said coil turns.

14. A burner system according to claim 4, which includes a third fuel tank held by said frame in an inverted state and adapted to supply fuel in liquid form to said burner coil means.

* * * * *